United States Patent [19]

Bachmann

[11] 4,357,695

[45] Nov. 2, 1982

[54] REDUCTION GEAR FOR ELECTRONIC TIMEPIECE

[75] Inventor: Peter Bachmann, Bettlach, Switzerland

[73] Assignee: Ebauches Bettlach, S.A., Soleure, Switzerland

[21] Appl. No.: 169,798

[22] Filed: Jul. 17, 1980

[30] Foreign Application Priority Data

Aug. 10, 1979 [CH] Switzerland ............................ 7385/79

[51] Int. Cl.³ .................... G04B 29/00; F16H 55/17
[52] U.S. Cl. ........................................ 368/322; 74/434; 74/457
[58] Field of Search ............................ 368/28, 31–40, 368/62, 76, 77, 78, 80, 88, 89, 97, 107, 108, 124, 125, 155–160, 220–223, 228, 232, 233, 322–323; 74/84, 434–436, 457, 460, 462

[56] References Cited

U.S. PATENT DOCUMENTS

| 2,307,886 | 1/1943 | Hansson | 74/436 X |
| 3,699,822 | 10/1972 | Wildhaber | 74/437 |
| 3,765,651 | 10/1973 | Lifferth | 74/434 X |
| 4,200,000 | 4/1980 | Fluehmann | 74/437 |

Primary Examiner—Vit W. Miska
Attorney, Agent, or Firm—Stevens, Davis, Miller & Mosher

[57] ABSTRACT

A pinion of a reduction gear intended for use in electronic timepieces having a stepping motor, particularly wrist watches, takes the form of a cylindrical body having an axial blind hole and two teeth milled at one end of the body. The flancs of the teeth are plane parallel surfaces. The distance between the axis of rotation of the pinion and the axis of rotation of a toothed wheel of the reduction gear is slightly less than the radius of the tip-circle of the wheel, so that the two teeth of the pinion block the wheel during the resting period of the motor. If a wheel with 60 teeth is used, it may constitute the fourth wheel in an electronic watch having hands.

6 Claims, 5 Drawing Figures

REDUCTION GEAR FOR ELECTRONIC TIMEPIECE

This invention relates to gearing for electronic timepieces, and more particularly to a reduction gear of the type having a driving pinion rotating step by step and a driven wheel with teeth which engage those of the pinion and block it whenever a disturbing torque is transmitted from the wheel to the pinion during the intervals between steps.

The hands of electronic watches having stepping motors are generally driven by the motor via a reduction gear, the reduction ratio of which depends upon the stepping angle of the motor. One particularity of such gearing is that it can be advantageously designed to block if a torque is inopportunely exerted upon a driven wheel during an interval between two steps of the motor. With such a design, the untimely torque is not transmitted to the motor, so that it is not necessary to provide magnetic blocking means capable of resisting such a torque, which may be considerable.

There are various ways of designing this gearing, but the arrangements proposed thus far all present certain drawbacks.

A design described in West German Pat. No. 27 09 348, suitable for use in watch movements, comprises a pinion with six leaves driving a wheel with 60 teeth. The reduction ratio is thus 1:10.

In another prior art design, but intended for clocks, disclosed in International (PCT) Publication No. WO 79/00930, the driving pinion has two teeth. It is integral with the rotor shaft of the stepping motor, so that it rotates 180° at each step, and the teeth, which take the form of cylindrical pins having a conical widening at the base, are integral with two parallel plates. The teeth of the driven wheel have radial flanks and tips shaped to form a cylindrical surface coaxial with the wheel. They engage the cylindrical teeth of the rotor up to the axis thereof.

This design, which can be produced by casting or molding for clocks, cannot be adapted to the size of a wrist watch, where the driving pinion directly integral with the rotor shaft may be less than 0.5 mm in diameter.

It is an object of this invention to provide an improved reduction gear, suitable for use in electronic wrist watches having stepping motors, wherein the number of stages between the rotor pinion of the stepping motor and the indicator gears is reduced to a minimum in order to simplify the construction, wherein the gearing conditions are the best possible in order to avoid overloading the motor, and which can be manufactured by simple mechanical means so as to allow mass-production.

To this end, in the reduction gear for electronic timepieces according to the present invention, the improvement comprises a pinion including a pinion body having an axis of rotation and two diametrically opposite teeth made in one piece with the body, the flanks of the teeth being plane surfaces parallel to the axis of rotation, and a toothed wheel including teeth having an ogival tip and radially oriented plane flanks, the distance between the axis of rotation of the pinion and that of the wheel being less than the radius of the tip-circle of the wheel.

Preferred embodiments of the invention will now be described in detail with reference to the accompanying drawing, in which.

Figure 1:
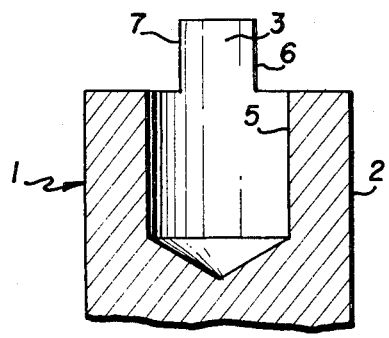
FIG. 1 is an axial section through the pinion in a first embodiment.

The pinions illustrated in FIGS. 1-4 are metal parts which may be produced by profile-turning, i.e., under optimum conditions of productivity. The pinion shown in FIG. 1 comprises a body 1 having a cylindrical outer surface 2 and two diametrically opposite teeth 3 and 4 extending from one end. Body 1 includes an axial blind hole 5, the diameter of which corresponds to that of the arcuate inner faces of teeth 3 and 4. The tip faces of teeth 3 and 4 are formed by portions of cylindrical outer surface 2, while flanks 6 and 7 are plane surfaces parallel to the axis of body 1 and parallel to each other. Thus, after hole 5 has been drilled, teeth 3 and 4 can be machined merely by lateral milling of the end of the part constituting body 1, using one or two milling-cutters acting perpendicular to the axis of the pinion.

Figure 2:
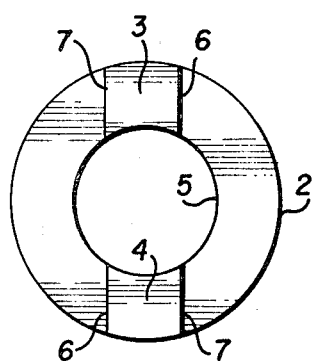
FIG. 2 is a top plan view of the pinion of FIG. 1.

In cases where the pinion illustrated in FIGS. 1 and 2 is directly integral with the rotor of a stepping motor in an electronic watch having hands, body 1 may continue at the end opposite teeth 3 and 4 into a shaft bearing the magnet of the motor. This shaft will also include two cylindrical surfaces intended to carry bearings. A shank may also be provided at the end opposite the teeth. The foregoing elements are of conventional construction and need not be further described.

Figure 3:
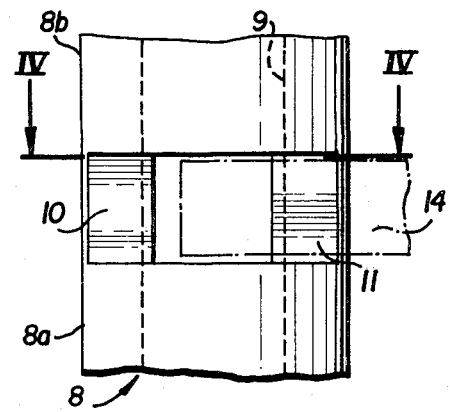
FIG. 3 is an elevation of the pinion in a second embodiment.
Figure 4:
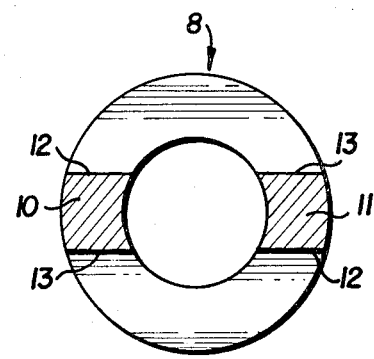
FIG. 4 is a section taken on the line IV—IV of FIG. 3.

FIGS. 3 and 4 show another embodiment in which the pinion comprises a body 8 divided into two coaxial but axially spaced parts 8a and 8b. A cylindrical center hole 9 passes through parts 8a and 8b, which are joined by two teeth 10 and 11 having, like teeth 3 and 4, flanks 12 and 13 in the form of plane surfaces parallel to the axis of the pinion. Teeth 10 and 11 are likewise machined by milling, in which case two slots separating parts 8a and 8b will be milled in body 8. Center hole 9, drilled from one end of body 8, is a blind hole, so that a pivot shank can be provided at that end of body 8. FIG. 3 also shows in dot-dash lines the profile of a tooth of a wheel 14 meshing with the pinion.

Figure 5:
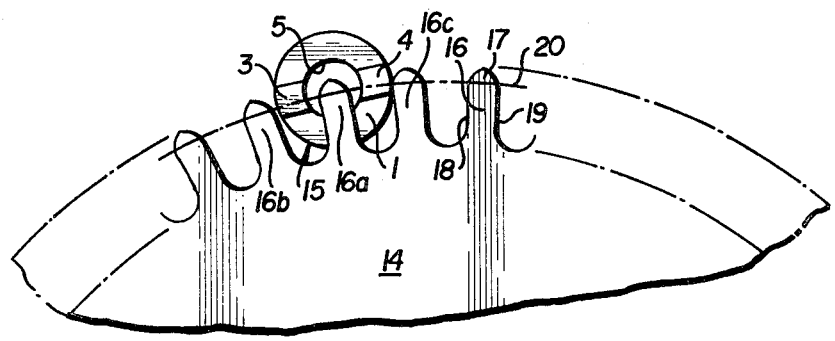
FIG. 5 is a top plan view, on a smaller scale, of a gear comprising the pinion of FIG. 1.

The gearing conditions of a driving pinion 15, such as one of those shown in FIGS. 1-4, meshing with driven wheel 14 may be more clearly seen in FIG. 5. Wheel 14 has, for example, sixty teeth 16. Each of the teeth 16a, 16b, etc., has an ogival tip 17 and two flanks 18 and 19 formed by plane surfaces parallel to the axis of wheel 14 and directed at least substantially radially. The axis of pinion 15 is situated on a circle 20, the radius of which is slightly less than that of the tip-circle of wheel 14. Teeth 3 and 4 of pinion 15 will be oriented relative to the magnet of the rotor so that in the stopping position of the latter, these teeth are positioned tangentially relative to wheel 14. Teeth 3 and 4 of pinion 15 will therefore be engaged one on each side of a tooth 16a and between two other teeth 16b and 16c adjacent to tooth 16a. In this way, pinion 15 serves as a blocking element for wheel 14. During the periods between pulses, pinion 15 is obviously held in a fixed position by the magnetic blocking of the rotor. Hence wheel 14 is likewise blocked; for since tooth 16b or 16c, which comes in contact with pinion 15 when wheel 14 moves, is resting against the cylindrical tip face of one of the teeth of pinion 15, this tooth 16b or 16c exerts a radial force on pinion 15. If pinion 15 rotates through 180° each second, wheel 14 advances one step, hence 1/60 of a revolution at each step. It may therefore be provided with an arbor which directly bears the seconds-hand. The gear-train is greatly simplified. The module of the teeth may be about 0.15, for example.

Furthermore, despite the fact that the teeth of the pinion have flanks in the form of plane surfaces bounded by dihedral angles, the gearing conditions are nevertheless satisfactory. During rotation, wheel 14 advances with uniform motion from the moment when the driving tooth of pinion 15 drives tooth 16a which is engaged within the pinion. When the pinion reaches its new resting position, it transmits its motion to the wheel via the outer tip face of one of its teeth, whereas the other tooth stops the movement of the wheel at the precise instant when the rotor ceases rotating. Because the teeth of the wheel are then in contact with the tip surfaces of the teeth of the pinion there is no risk that the reaction on the pinion will force the magnetic block.

What is claimed is:

1. A reduction gear for an electronic timepiece, comprising
    a driving pinion adapted for step-by-step rotation and having a body with two teeth made in one piece with said body, said teeth being situated diametrically opposite one another and each having two plane flanks disposed parallel to the axis of rotation of said pinion, and
    a driven wheel having a plurality of teeth, each of said teeth having an ogival tip and two radially oriented plane flanks,
    said driving pinion meshing with said driven wheel, the distance between the axis of rotation of said driving pinion and the axis of rotation of said driven wheel being less than the length of the radius of the tip-circle of said driven wheel, whereby said teeth of said driven wheel block said driving pinion when a disturbing torque is transmitted from said driven wheel to said driving pinion during an interval in said step-by-step rotation thereof.

2. The reduction gear of claim 1, wherein said body has a cylindrical outer surface and includes an axial hole, the outer faces of said teeth of said pinion being formed by portions of said cylindrical outer surface, and the inner faces of said teeth of said pinion being formed by portions of the wall of said hole.

3. The reduction gear of claim 1, wherein said driven wheel comprises 60 teeth.

4. The reduction gear of claim 3, wherein said distance between the axis of rotation of said driving pinion and the axis of rotation of said driven wheel is sufficiently close to said length of the radius of the tip-circle of said driven wheel that said teeth of said pinion block said driven wheel when said teeth of said pinion are positioned tangentially relative to said driven wheel.

5. The reduction gear of claim 1, wherein said teeth of said pinion project axially from one end of said body.

6. The reduction gear of claim 1, wherein said body comprises two coaxial parts, said teeth of said pinion joining said two coaxial parts to one another.

* * * * *